(12) United States Patent
Jin (10) Patent No.: US 9,237,040 B1
(45) Date of Patent: Jan. 12, 2016

(54) PRE-EQUALIZATION ENHANCEMENT FOR TELECOMMUNICATION NETWORKS

(71) Applicant: Cisco Technology, Inc., San Jose, CA (US)

(72) Inventor: Hang Jin, Plano, TX (US)

(73) Assignee: Cisco Technologies, Inc., San Jose, CA (US)

( * ) Notice: Subject to any disclaimer, the term of this patent is extended or adjusted under 35 U.S.C. 154(b) by 0 days.

(21) Appl. No.: 14/642,979

(22) Filed: Mar. 10, 2015

(51) Int. Cl.
*H04B 7/005* (2006.01)
*H04L 25/03* (2006.01)
*H04L 25/08* (2006.01)

(52) U.S. Cl.
CPC .... *H04L 25/03012* (2013.01); *H04L 25/03878* (2013.01); *H04L 25/08* (2013.01); *H04L 2025/03808* (2013.01)

(58) Field of Classification Search
CPC ............... H04L 25/03343; H04L 25/0202; H04L 25/03987; H04L 27/01; H04L 2025/03426; H04L 2025/03808; H04L 2025/03885; H04L 2025/03802; H04L 5/0007; H04L 5/0021; H04L 5/0064
See application file for complete search history.

(56) References Cited

U.S. PATENT DOCUMENTS

| 8,526,485 | B2 | 9/2013 | Thompson et al. | |
| 8,937,992 | B2* | 1/2015 | Cooper et al. | 375/232 |
| 9,042,236 | B2* | 5/2015 | Bowler et al. | 370/242 |
| 2010/0290716 | A1* | 11/2010 | Mori et al. | 382/309 |
| 2012/0083235 | A1* | 4/2012 | Gomez et al. | 455/296 |
| 2013/0003565 | A1* | 1/2013 | Gotwals et al. | 370/248 |

OTHER PUBLICATIONS

Bisaglia et al., "Pre-equalization Techniques for Downlink and Uplink TDD MC-CDMA Systems", Wireless Personal Communications (2005) 35: 3-18, DOI: 10.1007/s11277-005-8736-8, Oct. 2005, 16 Pages.
CableLabs®, "Proactive Network Maintenance Using Pre-equalization", DOCSIS® Best Practices and Guidelines, CM-GL-PNMP-V02-110623, Jun. 2011, 133 Pages.

* cited by examiner

*Primary Examiner* — Siu Lee
(74) *Attorney, Agent, or Firm* — Edell, Shapiro & Finnan, LLC (57) ABSTRACT

Presented herein are techniques for enhancing pre-equalization operations in a telecommunications network. In one example, a cable modem termination system (CMTS) determines the coherent bandwidth for pre-equalization coefficients associated with upstream transmissions received from a cable modem. The CMTS uses the coherent bandwidth of the pre-equalization coefficients to calculate a time constant for a time domain filter that may be applied to the pre-equalization coefficients. The CMTS also calculates, based on the time constant, filter coefficients for the time domain filter and applies the time domain filter to the pre-equalization coefficients to generate signal-to-noise ratio (SNR)-enhanced pre-equalization coefficients. The CMTS then sends the SNR-enhanced pre-equalization coefficients to the cable modem.

20 Claims, 6 Drawing Sheets

PRE-EQUALIZATION ENHANCEMENT FOR TELECOMMUNICATION NETWORKS

TECHNICAL FIELD

The present disclosure relates to pre-equalization techniques for telecommunications networks.

BACKGROUND

A Hybrid Fiber Coaxial (HFC) network is a telecommunications network that uses optical fiber cables and coaxial cables in different portions of the network to carry content (e.g., video, data, voice, etc.). For example, a system operator may install (or have installed) fiber optic cable from the distribution center (head-end facility) to intermediate nodes located close to a large number of users. From these intermediate nodes, coaxial cable may extend to individual businesses, residences, or other locations. A HFC network may be advantageous in that features of fiber optic cable (e.g., high bandwidth, low noise/interference susceptibility, etc.) can be utilized to reach points close to the users without having to install fiber optic cables to individual locations.

The Data Over Cable Service Interface Specification (DOCSIS) is a telecommunications standard that has been widely used by network operators to provide high-speed data services to customers. For example, DOCSIS is employed by many cable television operators to provide Internet access over their existing HFC infrastructure.

DESCRIPTION OF EXAMPLE EMBODIMENTS

Overview

Presented herein are techniques for enhancing pre-equalization operations in a telecommunications network. In one example, a cable modem termination system (CMTS) determines the coherent bandwidth for pre-equalization coefficients associated with upstream transmissions received from a cable modem. The CMTS uses the coherent bandwidth of the pre-equalization coefficients to calculate a time constant for a time domain filter that may be applied to the pre-equalization coefficients. The CMTS also calculates, based on the time constant, filter coefficients for the time domain filter and applies the time domain filter to the pre-equalization coefficients to generate signal-to-noise ratio (SNR)-enhanced pre-equalization coefficients. The CMTS then sends the SNR-enhanced pre-equalization coefficients to the cable modem.

Example Embodiments

DOCSIS is a communication protocol that is used for data transmissions (e.g., audio, video, Internet traffic, etc.) between a hub or headend facility (HEF) and, for example, a cable modem (CM) at a customer premise. For cable modem operations, a cable modem termination system (CMTS) is typically deployed in the HEF or hub and is configured to manage and support programming and Internet services for a plurality of cable modems.

DOCSIS version 3.1, in particular, expands upon existing DOCSIS protocol standards and deployed systems by way of orthogonal frequency-division multiplexing (OFDM) technology. In accordance with OFDM, a given frequency spectrum/space, sometimes referred to as a channel, is divided into a plurality of orthogonal subcarriers that each comprises a small portion of the available spectrum. Each subcarrier is modulated orthogonally with respect to other subcarriers such that tens, hundreds or thousands of subcarriers may be used over a physical radio frequency (RF) channel. A subcarrier may comprise, for example, 25 or 50 kilohertz (KHz) of RF bandwidth. In one specific example, a six (6) megahertz (MHz) channel may be divided into 25 KHz wide subcarriers, thereby yielding 240 potential subcarriers (6 MHz/25 KHz=240 available subcarriers). In another example, a 6 megahertz (MHz) channel may be divided into 50 KHz wide subcarriers, thereby yielding 120 potential subcarriers (6 MHz/50 KHz=120 available subcarriers).

Figure 1:
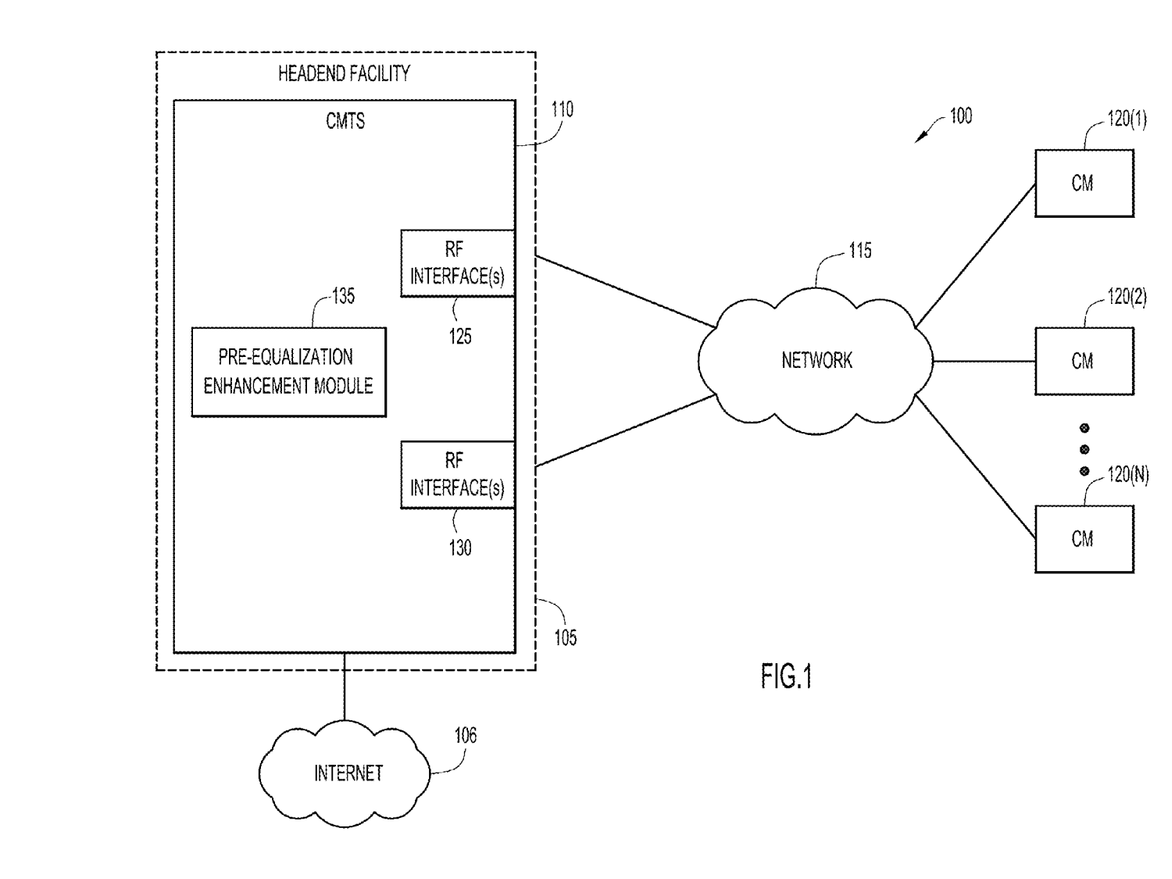
FIG. 1 is a block diagram of a telecommunications network configured to implement pre-equalization enhancement techniques in accordance with an example embodiment.

FIG. 1 illustrates an example of a telecommunications network 100 (e.g., cable network) that utilizes Single-Carrier Quadrature Amplitude Modulation (QAM) (SC-QAM) and/or OFDM channels for data transmission. Telecommunications network 100 includes a CMTS 110 that forms part of a headend facility 105, a network 115 composed of, for example, HFC equipment, and a plurality a cable modems 120(1)-120(N). The cable modems 120(1)-120(N) may, for example, reside in one or more customer premises. The CMTS 110 includes one or more downstream radio frequency (RF) interfaces 125, one or more upstream RF interfaces 130, and a pre-equalization enhancement module 135. It is to be appreciated that CMTS 110 may include other components that, for ease of illustration, have been omitted from FIG. 1.

The cable modems 120(1)-120(N) act as a bridge between the network 115 and home networks (not shown) for providing data services (e.g., Internet, telephony, television services, video-on-demand, etc.) to/from the customer premises. Cable modems 120(1)-120(N) of FIG. 1 may be DOCSIS/EuroDOCSIS compliant (version 3.0 or greater) cable modems which make use of SC-QAM and/or OFDM technology. It is to be appreciated that the techniques described herein are not limited to use in DOCSIS 3.1 or other DOCSIS systems, but rather may also be used with other protocols or communication techniques (e.g., asynchronous time division multiple access (ATDMA)).

The CMTS 110 may be, for example, an integrated, distributed, or modular CMTS that connects the network 115 to a data network, such as the Internet 106. The cable modems 120(1)-120(N) may provide a packet interface (e.g., Ethernet compliant) to various consumer premises equipment (CPE) (not shown). In certain arrangements, one or more of the cable modems 120(1)-120(N) may be connected to a hub or router (also not shown), for example, to implement a home network, wireless access, etc. A cable modem (or a second cable modem) may be integrated in other equipment, for example a "set-top-box" (STB) which provides an interface to a television.

Cable modems 120(1)-120(N) and CMTS 110 communicate over frequency channels of network 115. In addition, individual cable modems may be assigned to transmit on a specific frequency segment (e.g., a specific frequency segment that comprises a group of OFDM subcarriers in the case of DOCSIS 3.1, or a specific SC-QAM channel within the bonded SC-QAM channels). As such, a DOCSIS enabled cable modem may have multiple transceivers simultaneously operable at different frequencies.

Wideband probing is used during both admission operations and normal upstream operations (e.g., when a cable modem sends traffic to a CMTS) in order to "probe" the frequency channels of network 115. Probing enables the CMTS 110 to determine pre-equalization coefficients for use by the cable modems 120(1)-120(N). The pre-equalization coefficients are used by the cable modems 120(1)-120(N) to equalize transmissions to the CMTS 110. That is, the equalization coefficients may be used, for example, to adjust the magnitude of upstream transmissions (e.g., increase transmission power and/or decrease transmission power), change phase, etc.

During wideband probing, the cable modems 120(1)-120(N) send known probing signals (known sequences) across the operational frequency band (except excluded subcarriers) within an upstream frame. The probing frames have the same size and boundary as normal frames (e.g., frames used for transmission of upstream traffic) and multiple cable modems can send probing signals on the same symbol through orthogonal frequency-division multiple access (OFDMA) techniques. Also, within a probing frame, a cable modem can send the probing signal at a single symbol time or at multiple symbol times (e.g., staggered). Since the CMTS 110 has prior knowledge of the probing signals, the CMTS can use the probing signals to determine channel information (e.g., magnitude and phase variations over frequency) for each cable modem that sends probing signals.

The CMTS 110 derives pre-equalization coefficients for each cable modem 120(1)-120(N) from the probing signal(s) sent by the corresponding cable modem. The pre-equalization coefficients, which capture the HFC channel information, are provided to the cable modems 120(1)-120(N). Each of the cable modems 120(1)-120(N) use the pre-equalization coefficients to adjust the spectrum of its output signal to compensate for magnitude and phase variations caused by the HFC network 115. The use of the pre-equalization coefficients ensures that the signals received at CMTS 110 are "equalized," thereby leading to better received signal quality. That is, pre-equalization is intended to adjust the output spectrum at a cable modem transmitter to compensate for the frequency-dependent attenuation of HFC.

More specifically, the pre-equalization coefficients are computed from the probing coefficients as shown below in Equation 1.

$$\text{Pre\_eq}(i) = 1/\text{symbol}(i), i=1,2,3,\ldots, \quad \text{Equation 1:}$$

where symbol(i) is the probing coefficient, and pre_eq(i) is the pre-equalization coefficients, and "i" is the index referring to the ith active subcarrier.

After computation, the pre-equalization coefficients (Pre_eq(i), i=1, 2, 3, ... ) are then sent down to the corresponding cable modem for use in pre-equalizing transmissions, as given below in Equation 2.

$$S(i) = \text{pre\_eq}(i) * S0(i), i=1,2,3,\ldots, \quad \text{Equation 2:}$$

where $S0(i)$ is the original signal and $S(i)$ is the pre-equalized signal.

After computation, the pre-equalization coefficients (Pre_eq(i), i=1, 2, 3, ... ) are then sent down to the corresponding cable modem for use in pre-equalizing transmissions, as given below in Equation 2.

Equations 1 and 2, above, are simplified and omit the affects of channel noise. Adding the noise effect, Equation 1 may be rewritten below as Equation 1'.

$$\text{Pre\_eq}(i) = 1/(\text{symbol}(i)+n) \sim = 1/\text{symbol}(i)*(1-n/\text{symbol}(i) = 1/\text{symbol}(i)*(1-1/\text{snr}), \quad \text{Equation 1':}$$

where i=1, 2, 3, ... ; n is the noise level included in the probing signal; and snr is the probing signal noise ratio in a linear form.

It is to be noted that Equation 1' is derived in the sense that the noise is interpreted and expressed statistically.

Similarly, Equation 2 can be rewritten to take in account of affects of channel noise as Equation 2', below.

$$S(i) = 1/\text{symbol}(i)*(1-1/\text{snr})*S0(i)+n' \sim = 1/\text{symbol}(i)* S(0)(i)*(1-1/\text{snr})*(1+1/\text{snr}') \sim = 1/\text{symbol}(i)*S0(i)* (1+\text{sqrt}(2)/\text{snr}) \quad \text{Equation 2':}$$

It is to be noted that Equation 2' is also derived in the sense that the noise is interpreted and expressed statistically. That is, $1/\text{snr}' - 1/\text{snr} = \sim\text{sqrt}(2)/\text{snr}$, assuming snr=snr', and noises add in power.

As can be seen from the above equations and explanation, there is 3 dB SNR degradation on the received signal. Generally speaking, after updating pre-equalization coefficients N times, the received signal SNR is degraded by 10*log 10(N+1)dB. In other words, a problem with probing is that the probing signals have a limited signal-to-noise ratio (SNR), which means that while the probing signals carry the HFC channel information, the probing signals also carry noise. This leads to noise in the pre-equalization coefficients, which in turn leads to a noise increase in the cable modem output signals when the cable modems apply the pre-equalization coefficients to the output signal. As such, while the pre-equalization equalizes the output signals transmitted by the cable modems, pre-equalization also adds noise to the output signals. Which effect dominates (the SNR enhancement due to the equalized signal or the SNR degradation due to the noise addition), is circumstantial and may be, in certain arrangements, evaluated on a case-by-case basis. As such, presented herein are techniques that enable a CMTS, such as CMTS 110, to enhance the pre-equalization coefficient SNR and accordingly reduce the likelihood of cable modem output signal SNR degradation caused by application of pre-equalization coefficients (e.g., caused by pre-equalization). The techniques presented herein also enable CMTS 110 to quantitatively assess the effectiveness of pre-equalization under various conditions and initiate a selected action to ensure optimal signal SNR.

As noted above, the CMTS 110 includes a pre-equalization enhancement module 135 that is configured to execute, entirely or in part, the pre-equalization enhancement techniques presented herein. The pre-equalization enhancement techniques presented herein include two (2) stages/phases that are utilized to alleviate the signal quality degradation due to the potential addition of noise during pre-equalization and to ensure optimal SNR of received signal. More specifically, in accordance with a first phase, referred to herein as the pre-equalization coefficient SNR enhancement phase, the pre-equalization enhancement module 135 is configured to filter generated pre-equalization coefficients to remove channel noise. During a second phase, referred to herein as the pre-equalization assessment phase, the pre-equalization enhancement module 135 is configured to, for each cable modem 120(1)-120(N), determine if application of the pre-equalization coefficients improves output signal SNR. If SNR is not improved after pre-equalization, then the use of pre-equalization can be effectively suspended for a period of time and periodically re-assessed.

Referring first to the pre-equalization coefficient SNR enhancement phase, the enhancement is based on the differing bandwidth of pre-equalization coefficients and channel noise. The coherent bandwidth of the pre-equalization coefficients, representing how fast the channel varies over frequency, is substantially wider than the bandwidth of channel noise. As noted, the intention of the pre-equalization is to "equalize" large scale signal variations, such as cable tilt, hardware impairments (e.g., diplexer rolloff), etc. The small scale variation, if any, may be removed through channel estimation through embedded pilots. The pre-equalization coefficients may, for example, have a bandwidth of 1 MHz or more.

In contrast, the coherent bandwidth of noise will be 25 kHz or 50 kHz (depending on the subcarrier width), as noise on different subcarriers experience no correlations. Channels may, at times, experience wideband ingress noises, but the correlation is still zero as the signals on different subcarriers are random by nature/design. Due to the differences in the bandwidths of the pre-equalization coefficients (substantially wide) and channel noise it is possible to design a filter that removes a substantially amount of the noise without affecting the pre-equalization coefficients. More specifically, a time domain low pass filter (LPF) with a time constant that is substantially smaller that the symbol time duration (Ts) (e.g., time constant<<Ts) may be generated. The filter coefficients for this time domain LPF may be convolved with the pre-equalization coefficients. Since the noise power is spread over Ts (coherent BW is 25 khz or 50 khz), the majority of the noise will be filtered out. As the time constant is inversely proportion to the coherent bandwidth, the pre-equalization coefficients have a 1 us time constant with a 1 MHz coherent bandwidth, while the noises have a 20 us or 40 us time constant with a 25 kHz or a 50 kHz coherent bandwidth, respectively. In general, the time constant, or duration is equal to the inverse of the bandwidth (e.g., Ts=1/BW).

As described further below, the time constant of the time domain LPF can be estimated by analyzing the channel variation over frequency (e.g., based on the coherent bandwidth of the pre-equalization coefficients). For example, if the probing signal has relatively little change over twenty (20) subcarriers, the time constant may be set at Ts/20, again where Ts is the symbol duration.

DOCSIS 3.1 uses an Orthogonal Frequency Division Multiple Access (OFDMA) technique in which the channel is sliced into small frequency block, referred to as "minislots." The minislots have a size/height and are each allocated to one of the cable modems by the CMTS. In general, multiple minislots are used to transmit a single packet/frame. Through the allocation of the minislots, the CMTS can control exactly how much upload bandwidth each cable modem may use. The minislot height for 50 kHz subcarrier spacing is eight (8) and the minislot height for 25 kHz subcarrier spacing is sixteen (16) (i.e., q=8 and 16 for 50 kHz and 25 kHz subcarrier spacing, respectively).

In one specific example, the time constant is determined as shown below in Equation 3.

$$\text{Time constant}=Ts/q, \quad \text{Equation 3:}$$

where q is the minislot height.

Figure 2:
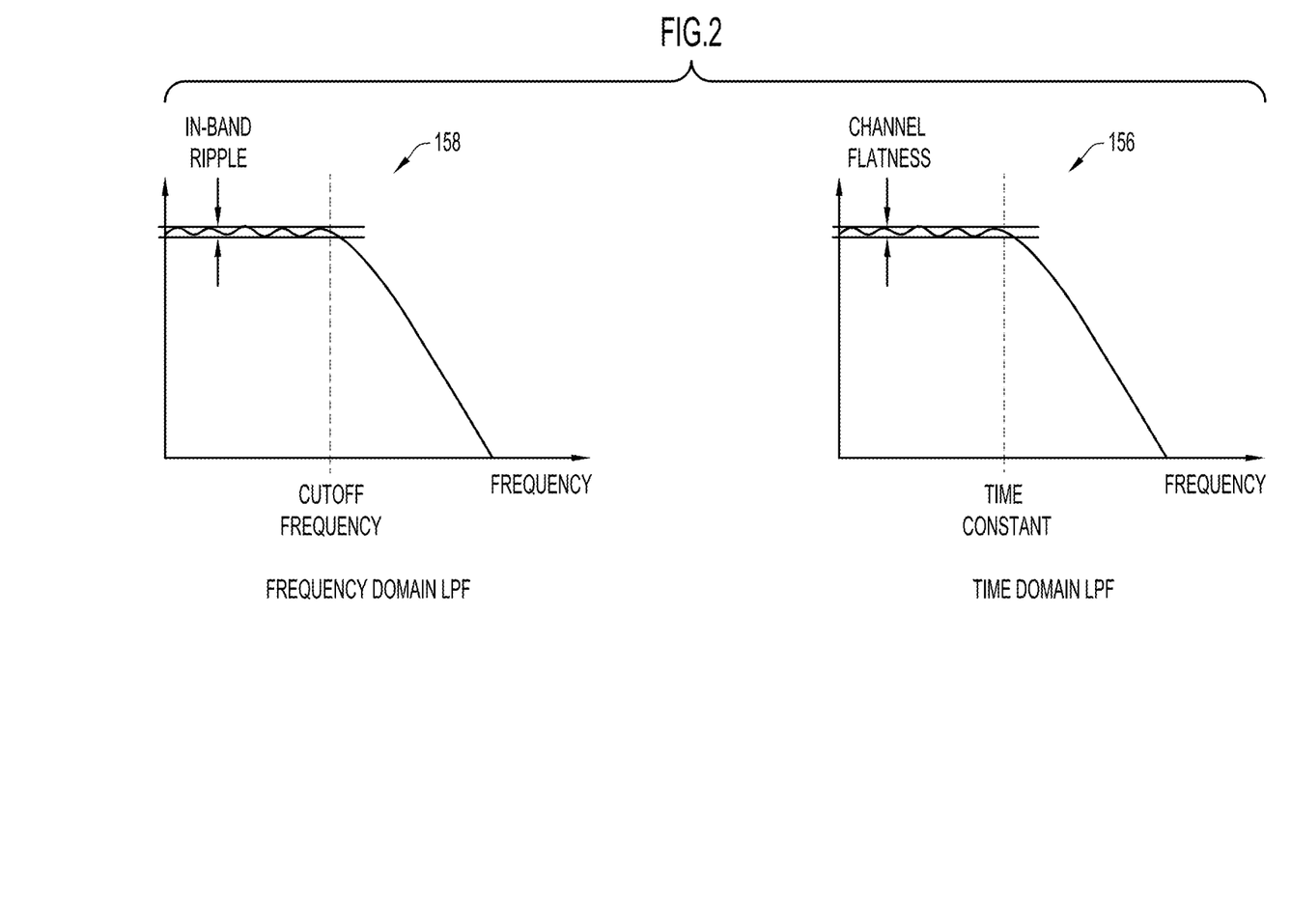
FIG. 2 is a schematic diagram illustrating a time domain low pass filter in accordance with an example embodiment.

FIG. 2 is a schematic diagram, illustrating at reference numeral 156, of the operation of a low-pass filter in the time domain, sometimes referred to herein as a time domain LPF, in accordance with examples presented herein. For ease of comparison, FIG. 2 also illustrates, at reference numeral 158, the operation of a conventional frequency domain LPF. In accordance with the examples presented herein, a time domain LPF can be designed once the associated time constant, filter type, and filter order are selected. As shown in FIG. 2, the filter parameters, such as time constant (e.g., the cut-off point for the filter), the channel flatness over time, etc., are defined in the time domain. However, a time domain LPF as presented herein processes/filters the pre-equalization coefficients in the frequency domain, rather than in the time domain. The design algorithm for a time domain LPF may be compared to that of a frequency domain LPF in that the frequency and time are mirrored (e.g., the time constant replaces the cut-off frequency, channel flatness over time replaces in-band/out-band ripple, etc.).

Figure 3:
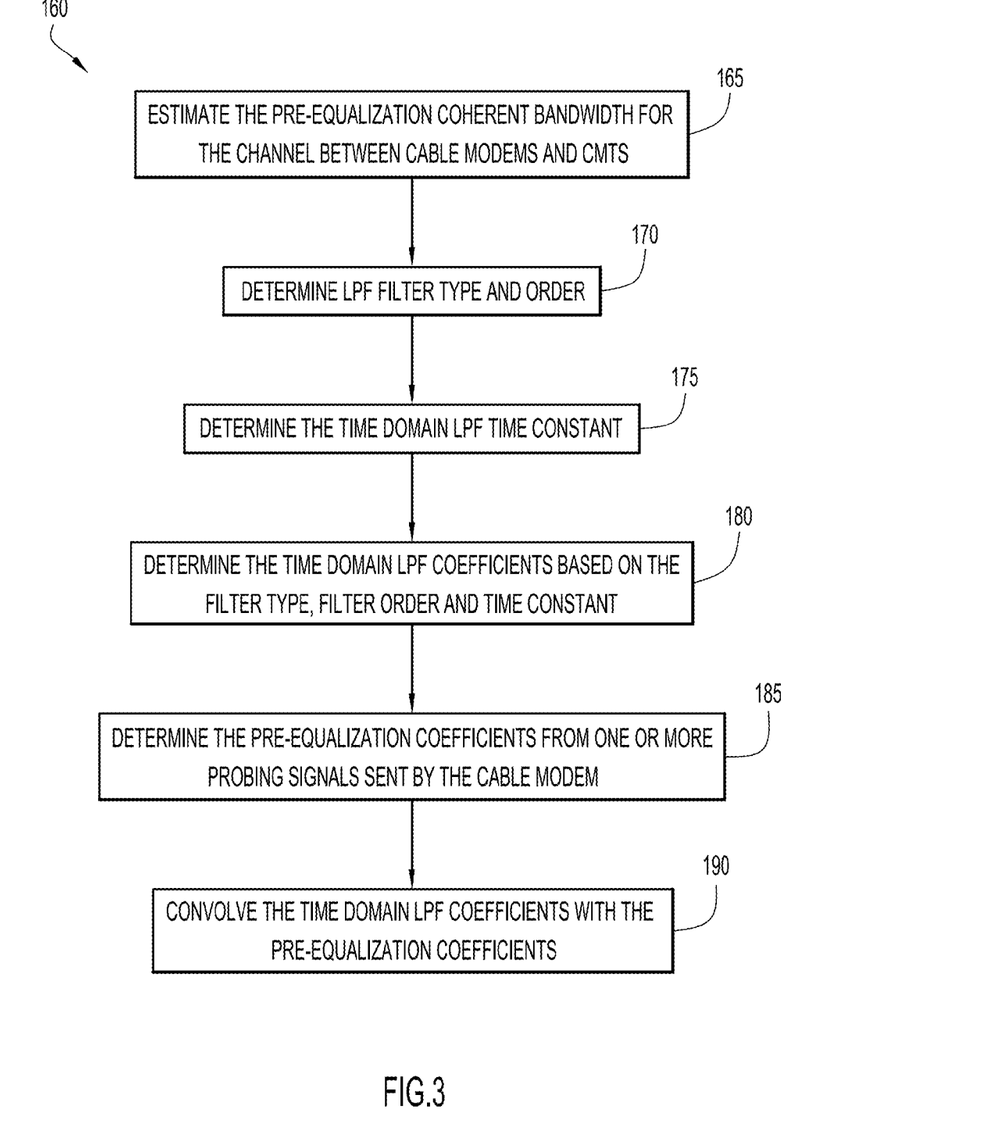
FIG. 3 is a flowchart of a method for generation of enhanced pre-equalization coefficients in accordance with an example embodiment.

FIG. 3 is a flowchart of a method 160 for processing pre-equalization coefficients with a time domain LPF in accordance with examples presented herein. For ease of illustration, method 160 will be described with reference to the arrangement of FIG. 1 and, more particularly to the processing of pre-equalization coefficients for cable modem 120(1). As noted above, application of a time domain LPF in accordance with examples presented herein to pre-equalization coefficients for a cable modem serves to substantially remove the channel noise from the pre-equalization coefficients. As such, pre-equalization coefficients processed with a time domain LPF in accordance with examples presented herein are sometimes referred to herein as SNR-enhanced pre-equalization coefficients.

Returning to FIG. 3, method 160 begins at 165 where the pre-equalization enhancement module 135 estimates the pre-equalization coherent bandwidth (e.g., the bandwidth of the pre-equalization coefficients) for the channel between cable modem 120(1) and CMTS 110. The pre-equalization coherent bandwidth may be denoted as N*fc, where fc is the subcarrier spacing (e.g., 25 kHz, 50 kHz, etc.) of the channel. In certain examples, the default value for "N" is the height of the minislots (i.e., N=q).

Additionally, at 170, the pre-equalization enhancement module 135 determines the time domain LPF filter type and order. In certain examples, the filter type is a constant weight (averaging) filter and the order is set equal to "N." At 175, the pre-equalization enhancement module 135 determines the time domain LPF time constant from the bandwidth of the pre-equalization coefficients. The time domain LPF time constant may be determined, for example, in accordance with Equation 1, above (e.g., time constant=Ts/q=Ts/N). At 180, the pre-equalization enhancement module 135 determines the time domain LPF coefficients based on the filter type, filter order and time constant. The time domain LPF coefficients may be denote coefficients as a vector "C," where C={c0, c1, ..., cN}.

At 185, the pre-equalization enhancement module 135 determines the pre-equalization coefficients, denoted as a vector "P," where P={p0, p1, ..., pK}, from one or more probing signals sent by cable modem 120(1). The CMTS 110 may use a "pre-equalization OFF" function to schedule probing frames from the cable modem 120(1).

At 190, the pre-equalization enhancement module 135 convolves the time domain LPF coefficients ({c0, c1, ..., cN}) with the pre-equalization coefficients ({p0, p1, ..., pK}) to generate the SNR-enhanced pre-equalization coefficients. The convolution operation performed with the time domain LPF coefficients and the pre-equalization coefficients is given below in Equation 4.

$$\{p'0, p'1, \ldots, p'K+N+1\}=\text{conv}(C,P) \quad \text{Equation 4:}$$

As a result of the convolution, the first K+1 coefficients, denoted by a vector "P'" give the filtered/ SNR-enhanced pre-equalization coefficients, where P'={p',p'1, ..., p'K}. The SNR-enhanced pre-equalization coefficients given by vector P' generally correspond to the original pre-equalization coefficients "P" from which the channel noise has been substantially removed.

Each of the cable modems 120(1)-120(N) may experience different channel conditions. As such, SNR-enhanced pre-equalization coefficients may be separately computed for each of the cable modems 120(1)-120(N) in accordance with method 160.

Figure 4:
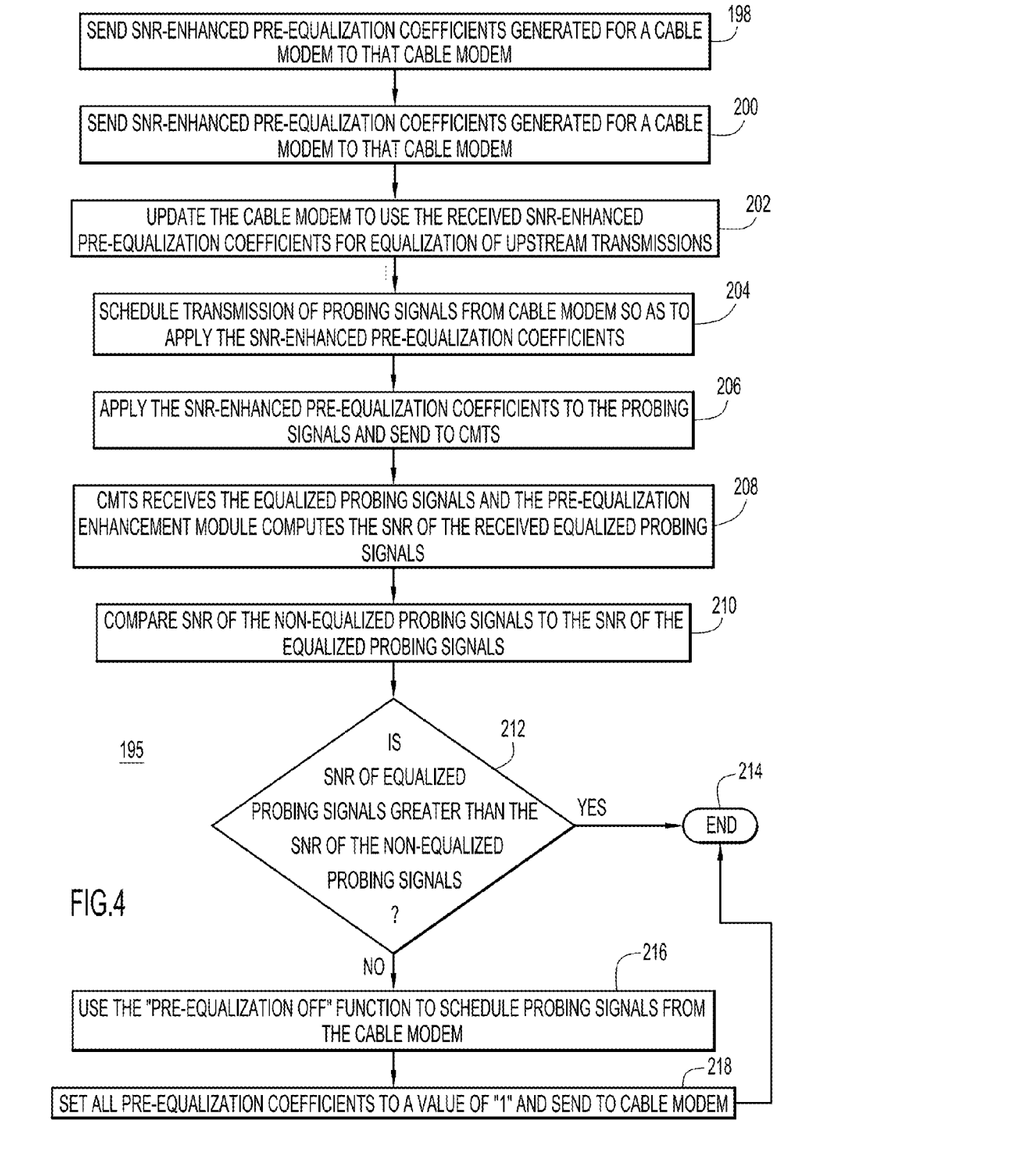
FIG. 4 is a flowchart of a method for assessing enhanced pre-equalization coefficients in accordance with an example embodiment.

As noted above, in addition to the pre-equalization coefficient SNR enhancement phase, there is a pre-equalization assessment phase in which a determination is made whether application of the pre-equalization coefficients improves output signal SNR. If SNR is not improved after pre-equalization, then the use of pre-equalization can be effectively suspended for a period of time and periodically re-assessed. FIG. 4 is a flowchart of a method 195 for assessing SNR-enhanced pre-equalization coefficients in accordance with examples presented herein. For ease of illustration, method 195 will be described with reference to the arrangement of FIG. 1 and, more particularly to the assessments of SNR-enhanced pre-equalization coefficients generated for cable modem 120(1).

Method 195 begins at 198 where the pre-equalization enhancement module 135 computes SNR-enhanced pre-equalization coefficients for cable modem 120(1), as described above. That is, the CMTS 110 uses a "pre-equalization OFF" function to schedule probing signals from the cable modem 120(1). Since the "pre-equalization OFF" function is used, no equalization is applied to the probing signals before transmission to the CMTS 110. As such, these probing signals are referred to herein as "non-equalized probing signals." The pre-equalization enhancement module 135 uses the non-equalized probing signals to compute pre-equalization coefficients ({p0, p1, ..., pK}). The pre-equalization enhancement module 135 convolves the time domain LPF filter coefficients ({c0, c1, ..., cN}) with the pre-equalization coefficients to generate the SNR-enhanced pre-equalization coefficients for cable modem 120(1). The pre-equalization enhancement module 135 also determines the SNR of the non-equalized probing signals and the SNR may be stored for subsequent use, as described below.

At 200, the pre-equalization enhancement module 135 sends the SNR-enhanced pre-equalization coefficients generated for cable modem 120(1) to the cable modem 120(1). At 202, the cable modem 120(1) is updated to use the received SNR-enhanced pre-equalization coefficients for equalization of upstream transmissions. As noted, the probing signals for use in generating the SNR-enhanced pre-equalization coefficients are scheduled by the CMTS 110 using the "pre-equalization OFF" function (e.g., using no pre-equalization of the probing signals). However, at 204, the CMTS 110 uses a "pre-equalization ON" function to schedule transmission of the same probing signals from cable modem 120(1) (e.g., probing signals having the same configuration as used with the "pre-equalization OFF" function). Since the "pre-equalization ON" function is used, at 206 the cable modem 120(1) applies the SNR-enhanced pre-equalization coefficients to the probing signals before they are sent to CMTS 110. The probing signals to which the SNR-enhanced pre-equalization coefficients have been applied are referred to herein as "equalized probing signals."

At 208, the CMTS 110 receives the equalized probing signals and the pre-equalization enhancement module 135 computes the SNR of the received equalized probing signals. At 210, the pre-equalization enhancement module 135 compares the SNR of the equalized probing signals to the SNR of the non-equalized probing signals. If, at 212, it is determined that the SNR of the equalized probing signals is greater than the SNR of the non-equalized probing signals, then method 195 ends at 214, meaning that the SNR-enhanced pre-equalization coefficients improve SNR of upstream transmissions. The SNR-enhanced pre-equalization coefficients may then be placed into use the cable modem 120(1).

However, if it is determined at 212 that the SNR of the equalized probing signals is less than the SNR of the non-equalized probing signals, then at 216 the CMTS 110 uses the "pre-equalization OFF" function to schedule probing signals from the cable modem 120(1). The pre-equalization enhancement module 135 then sets all of the pre-equalization coefficients for cable modem 120(1) to a value of "1." Pre-equalization coefficients having a value of "1" are referred to herein as pass-through pre-equalization coefficients because they do not affect the magnitude or phase of upstream transmissions (e.g., the signals are transmitted without any equalization). The pass-through pre-equalization coefficients are sent to cable modem 120(1) and the method 195 ends at 214.

A determination at 212 that the SNR of the equalized probing signals is less than the SNR of the non-equalized probing signals means that the SNR-enhanced pre-equalization coefficients did not actually improve the SNR of upstream transmissions (e.g., noise dominates the coefficients) and thus use of the SNR-enhanced pre-equalization coefficients may degrade signal quality. However, certain conventional systems do not include a mechanism to turn-off pre-equalization for normal operation, but rather only for probing. As such, the operations at 216 and 218 account for this inability to turn-off pre-equalization by providing the cable modem 120(1) with the pass-through pre-equalization coefficients that will not affect upstream signal quality when applied. If a system includes the ability to turn-off pre-equalization, the operations at 216 and 218 could be replaced with an operation to deactivate pre-equalization during normal upstream operations.

Channel conditions may change over time. As such, method 195 may be repeated periodically to, for example, ensure that utilized SNR-enhanced pre-equalization coefficients are still appropriate, to determine if pass-through pre-equalization coefficients may be replaced by SNR-enhanced pre-equalization coefficients, etc.

It is to be appreciated that the order of operations described with reference to FIGS. 3 and 4 are merely illustrative and that, in other examples, certain operations may be performed in a different order. Additionally, other operations may be included in the methods of FIGS. 3 and 4.

Figure 5:
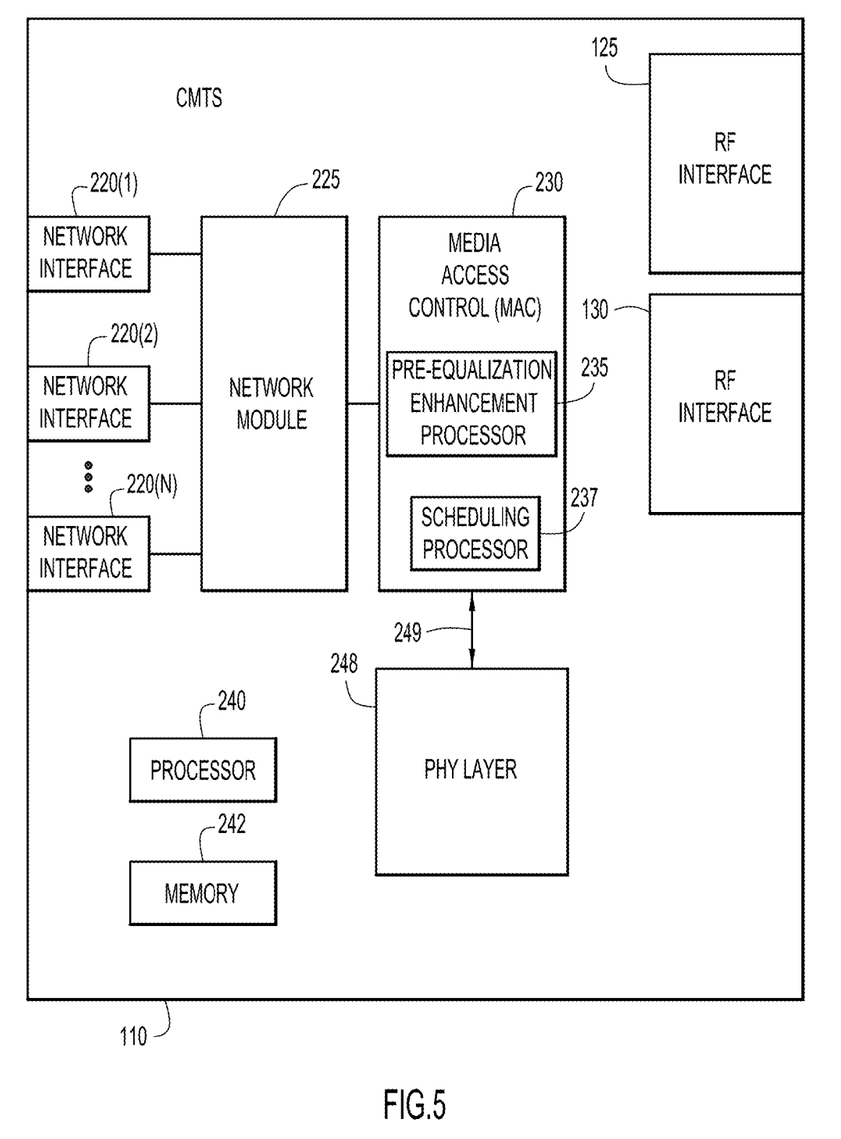
FIG. 5 is a block diagram of a cable modem termination system in accordance with an example embodiment.

FIG. 5 is a block diagram of one example configuration of CMTS 110 of FIG. 1. As noted above, CMTS 110 includes one or more RF interfaces 125 (for downstream traffic transmission) and one or more RF interfaces 130 (for upstream traffic reception). CMTS 110 also comprises a plurality of network interfaces 220(1)-220(N), a network module 225, a media access control (MAC) module/layer or simply MAC 230, a processor 240, a memory 242, and a physical (PHY) layer or simply PHY 248.

Generally, network module 225 interfaces with MAC 230 to transmit information between the network interfaces 220(1)-220(N) and the MAC 230. Processor 240 is generally configured to manage bandwidth processing, and is in communication with both MAC 230 and network module 225 via, for example, a Peripheral Component Interconnect (PCI) bus (not shown in FIG. 5).

MAC 230 comprises hardware, software, or a combination thereof and operates to prepare packets for transmission to cable modems and to prepare packets received from the cable modems for use by network module 225. The packet preparation may include, for example, encryption, decryption, suppression, expansion, concatenation, fragmentation, multiplexing, demultiplexing, etc., depending on the desired configuration of the CMTS 110 and the related components. As shown, MAC 230 also includes a scheduler 237 that schedules upstream transmission from cable modems 120(1)-120(N). The MAC 230 also includes a pre-equalization enhancement processor 235 that generally performs operations of the pre-equalization enhancement module 135 of FIG. 1. As such, in the illustrative arrangement of FIG. 5, the pre-equalization enhancement techniques are primarily implemented in MAC hardware/software. The MAC 230 may receive pre-equalization coefficients from PHY 248 via an Upstream External PHY Interface (UEPI) and the pre-equalization enhancement processor 235 performs post-processing (e.g., SNR enhancement) before SNR-enhanced pre-equalization coefficients are sent down to a corresponding cable modem. In certain examples, scheduler 237 and pre-equalization enhancement processor 235 are physical processing elements (e.g., digital logic gates in one or more application-specific integrated circuits (ASICS)) or a combination of physical processing elements and software.

Network interfaces 220(1)-220(N) may connect CMTS 110 with one or more computing network (e.g., a wide area network (WAN), a local area network (LAN), etc.). Network module 225 receives packets from MAC 230, and prepares the packets for forwarding to the network(s) via interfaces 220(1)-220(N). Similarly, network module 225 receives packets from the network(s) (via interfaces 220(1)-220(N)) and prepares these received packets for use by MAC 230. The packet preparation by network module 225 may include, for example, rate shaping, bandwidth limiting, priority queuing, etc., depending on the desired configuration of CMTS 110 and the related components.

Merely for ease of illustration, PHY 248 and MAC 230 are shown in FIG. 5 as separate elements. It is also to be appreciated that FIG. 5 is merely illustrative and is not intended to limit to imply a specific structure for CMTS 110. It is also to be appreciated that other implementations for a CMTS are possible and may accordingly use the techniques described herein.

Figure 6:
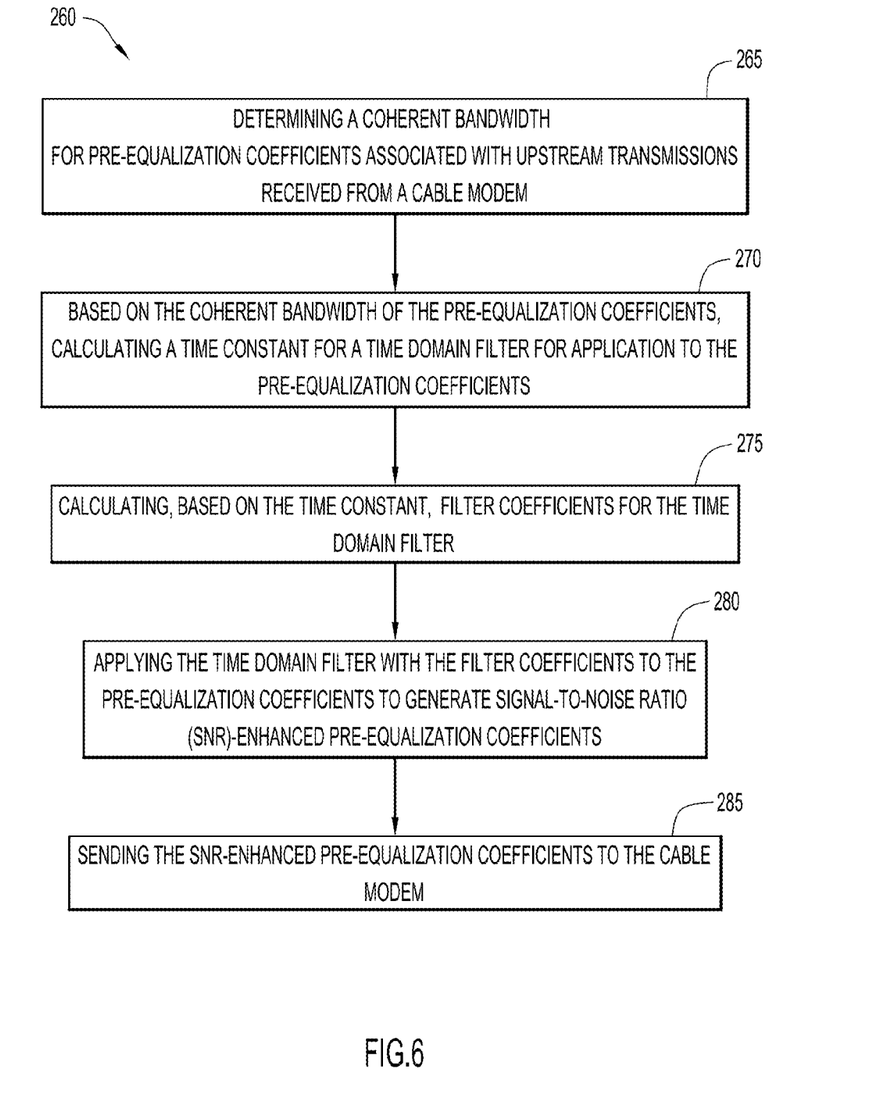
FIG. 6 is a high-level flowchart of a method in accordance with an example embodiment.

FIG. 6 is a high-level flowchart of a method 260 in accordance with examples presented herein. Method 260 begins at 265 where a CMTS determines the coherent bandwidth for pre-equalization coefficients associated with upstream transmissions received from a cable modem. At 270, the CMTS uses the coherent bandwidth of the pre-equalization coefficients to calculate a time constant for a time domain filter that may be applied to the pre-equalization coefficients. At 275, the CMTS calculates, based on the time constant, filter coefficients for the time domain filter. At 280, the CMTS applies the time domain filter to the pre-equalization coefficients to generate signal-to-noise ratio (SNR)-enhanced pre-equalization coefficients. At 285, the CMTS then sends the SNR-enhanced pre-equalization coefficients to the cable modem.

It is to be appreciated that the order of operations described with reference to FIG. 6 is merely illustrative and that, in other examples, certain operations may be performed in a different order. Additionally, other operations may be included in the method of FIG. 6.

As noted above, the techniques are primarily described herein with reference to DOCSIS 3.1. However, the techniques presented herein may be used in other arrangements such as, for example, ATDMA and/or a cable network that includes multiple OFDMA channels operating on different frequency ranges.

To again summarize, according to one example embodiment, a method is provided comprising: determining a coherent bandwidth for pre-equalization coefficients associated with upstream transmissions received from a cable modem; based on the coherent bandwidth of the pre-equalization coefficients, calculating a time constant for a time domain filter for application to the pre-equalization coefficients; calculating, based on the time constant, filter coefficients for the time domain filter; applying the time domain filter with the filter coefficients to the pre-equalization coefficients to generate signal-to-noise ratio (SNR)-enhanced pre-equalization coefficients; and sending the SNR-enhanced pre-equalization coefficients to the cable modem.

According to another example embodiment, a method is provided comprising: determining pre-equalization coefficients associated with upstream transmissions received from a cable modem; filtering the pre-equalization coefficients with a time domain low pass filter to generate signal-to-noise ratio (SNR)-enhanced pre-equalization coefficients; sending the SNR-enhanced pre-equalization coefficients to the cable modem; and assessing the effectiveness of the SNR-enhanced pre-equalization coefficients.

In apparatus form, an apparatus is provided comprising: one or more interfaces to receive, via a network, upstream traffic from cable modems; one or more processors that: determine a coherent bandwidth for pre-equalization coefficients associated with upstream transmissions received from a cable modem, based on the coherent bandwidth of the pre-equalization coefficients, calculate a time constant for a time domain filter for application to the pre-equalization coefficients, calculate, based on the time constant, filter coefficients for the time domain filter, apply the time domain filter with the filter coefficients to the pre-equalization coefficients to generate signal-to-noise ratio (SNR)-enhanced pre-equalization coefficients, and send the SNR-enhanced pre-equalization coefficients to the cable modem.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
   determining a coherent bandwidth for pre-equalization coefficients associated with upstream transmissions received from a cable modem;
   based on the coherent bandwidth of the pre-equalization coefficients, calculating a time constant for a time domain filter for application to the pre-equalization coefficients;
   calculating, based on the time constant, filter coefficients for the time domain filter;
   applying the time domain filter with the filter coefficients to the pre-equalization coefficients to reduce noise introduced during generation of the pre-equalization coefficients and to generate signal-to-noise ratio (SNR)-enhanced pre-equalization coefficients; and
   sending the SNR-enhanced pre-equalization coefficients to the cable modem.

2. The method of claim 1, wherein the time domain filter is a time domain low pass filter.

3. The method of claim 2, further comprising:
   selecting a type of time domain low pass filter; and
   selecting a filter order for the time domain low pass filter.

4. The method of claim 1, wherein applying the time domain filter to the pre-equalization coefficients comprises:

convolving the filter coefficients with the pre-equalization coefficients.

5. The method of claim 1, further comprising:
assessing the effectiveness of the SNR-enhanced pre-equalization coefficients.

6. The method of claim 5, wherein assessing the effectiveness of the SNR-enhanced pre-equalization coefficients comprises:
computing an SNR of non-equalized probing signals transmitted by the cable modem without performing pre-equalization;
computing an SNR of equalized probing signals transmitted by the cable modem after application of the SNR-enhanced pre-equalization coefficients; and
comparing the SNR of the non-equalized probing signals to the SNR of the equalized probing signals.

7. The method of claim 6, wherein when the SNR of the non-equalized probing signals is less than the SNR of the equalized probing signals, further comprising:
using the SNR-enhanced pre-equalization coefficients for upstream transmissions by the cable modem.

8. The method of claim 6, wherein when the SNR of the non-equalized probing signals is greater than the SNR of the equalized probing signals, further comprising:
scheduling the transmission of non-equalized probing signals from the cable modem;
setting all of the pre-equalization coefficients for the cable modem to a numerical value of one;
sending the pre-equalization coefficients having the numerical value of one to the cable modem; and
using the pre-equalization coefficients having the numerical value of one for upstream transmissions by the cable modem.

9. An apparatus comprising:
one or more interfaces to receive, via a network, upstream traffic from cable modems;
one or more processors that:
determine a coherent bandwidth for pre-equalization coefficients associated with upstream transmissions received from a cable modem;
based on the coherent bandwidth of the pre-equalization coefficients, calculate a time constant for a time domain low pass filter for application to the pre-equalization coefficients;
calculate, based on the time constant, filter coefficients for the time domain low pass filter;
apply the time domain low pass filter with the filter coefficients to the pre-equalization coefficients to reduce noise introduced during generation of the pre-equalization coefficients and to generate signal-to-noise ratio (SNR)-enhanced pre-equalization coefficients; and
send the SNR-enhanced pre-equalization coefficients to the cable modem.

10. The apparatus of claim 9, wherein the processor is configured to:
select a type of time domain low pass filter; and
select a filter order for the time domain low pass filter.

11. The apparatus of claim 9, wherein to apply the time domain low pass filter to the pre-equalization coefficients, the processor is configured to:
convolve the filter coefficients with the pre-equalization coefficients.

12. The apparatus of claim 9, wherein the processor is configured to:
assess the effectiveness of the SNR-enhanced pre-equalization coefficients.

13. The apparatus of claim 12, wherein to assess the effectiveness of the SNR-enhanced pre-equalization coefficients, the processor is configured to:
compute an SNR of non-equalized probing signals transmitted by the cable modem without performing pre-equalization;
compute an SNR of equalized probing signals transmitted by the cable modem after application of the SNR-enhanced pre-equalization coefficients; and
compare the SNR of the non-equalized probing signals to the SNR of the equalized probing signals.

14. The apparatus of claim 13, wherein when the SNR of the non-equalized probing signals is less than the SNR of the equalized probing signals, the processor is configured to:
use the SNR-enhanced pre-equalization coefficients for upstream transmissions by the cable modem.

15. The apparatus of claim 14, wherein when the SNR of the non-equalized probing signals is greater than the SNR of the equalized probing signals, the processor is configured to:
schedule the transmission of non-equalized probing signals from the cable modem;
set all of the pre-equalization coefficients for the cable modem to a numerical value of one;
send the pre-equalization coefficients having the numerical value of one to the cable modem; and
use the pre-equalization coefficients having the numerical value of one for upstream transmissions by the cable modem.

16. A method comprising:
determining pre-equalization coefficients associated with upstream transmissions received from a cable modem;
filtering the pre-equalization coefficients with a time domain low pass filter to reduce noise introduced during generation of the pre-equalization coefficients and to generate signal-to-noise ratio (SNR)-enhanced pre-equalization coefficients;
sending the SNR-enhanced pre-equalization coefficients to the cable modem; and
assessing the effectiveness of the SNR-enhanced pre-equalization coefficients.

17. The method of claim 16, wherein assessing the effectiveness of the SNR-enhanced pre-equalization coefficients comprises:
computing an SNR of non-equalized probing signals transmitted by the cable modem without performing pre-equalization;
computing an SNR of equalized probing signals transmitted by the cable modem after application of the SNR-enhanced pre-equalization coefficients; and
comparing the SNR of the non-equalized probing signals to the SNR of the equalized probing signals.

18. The method of claim 17, wherein when the SNR of the non-equalized probing signals is less than the SNR of the equalized probing signals, further comprising:
using the SNR-enhanced pre-equalization coefficients for upstream transmissions by the cable modem.

19. The method of claim 17, wherein when the SNR of the non-equalized probing signals is greater than the SNR of the equalized probing signals, further comprising:
scheduling the transmission of non-equalized probing signals from the cable modem;
setting all of the pre-equalization coefficients for the cable modem to a numerical value of one;
sending the pre-equalization coefficients having the numerical value of one to the cable modem; and using the pre-equalization coefficients having the numerical value of one for upstream transmissions by the cable modem.

20. The method of claim 16, further comprising:

determining a coherent bandwidth for the pre-equalization coefficients associated with the upstream transmissions received from the cable modem;

based on the coherent bandwidth of the pre-equalization coefficients, calculating a time constant for the time domain low pass filter; and calculating, based on the time constant, filter coefficients for the time domain low pass filter.

* * * * *

UNITED STATES PATENT AND TRADEMARK OFFICE
CERTIFICATE OF CORRECTION

| | | |
|---|---|---|
| PATENT NO. | : 9,237,040 B1 | Page 1 of 1 |
| APPLICATION NO. | : 14/642979 | |
| DATED | : January 12, 2016 | |
| INVENTOR(S) | : Hang Jin | |

It is certified that error appears in the above-identified patent and that said Letters Patent is hereby corrected as shown below:

On the Title Page, Item (73) Assignee:, replace "Cisco Technologies, Inc." with

-- Cisco Technology, Inc. --.

Signed and Sealed this
Third Day of May, 2016

Michelle K. Lee
*Director of the United States Patent and Trademark Office*